(12) United States Patent
Watanabe et al.

(10) Patent No.: US 9,165,195 B2
(45) Date of Patent: Oct. 20, 2015

(54) THRONGING DETERMINATION DEVICE AND THRONGING DETERMINATION METHOD

(71) Applicant: PANASONIC CORPORATION, Osaka (JP)

(72) Inventors: Takeshi Watanabe, Kanagawa (JP); Hirofumi Fujii, Kanagawa (JP); Sumio Yokomitsu, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/252,017

(22) Filed: Apr. 14, 2014

(65) Prior Publication Data

US 2014/0219503 A1 Aug. 7, 2014

Related U.S. Application Data

(63) Continuation of application No. PCT/JP2012/006504, filed on Oct. 10, 2012.

(30) Foreign Application Priority Data

Oct. 19, 2011 (JP) .................................. 2011-229889

(51) Int. Cl.
*G06K 9/00* (2006.01)
*G06T 7/20* (2006.01)
*H04N 7/18* (2006.01)

(52) U.S. Cl.
CPC ........ *G06K 9/00771* (2013.01); *G06K 9/00778* (2013.01); *G06T 7/2006* (2013.01); *G06T 2207/10016* (2013.01); *G06T 2207/20021* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 2006/0062429 A1* | 3/2006 | Ramaswamy et al. | ........ 382/103 |
| 2006/0195199 A1* | 8/2006 | Iwasaki et al. | .................... 700/1 |
| 2007/0121999 A1* | 5/2007 | Ma et al. | ........................ 382/103 |
| 2008/0106599 A1* | 5/2008 | Liu et al. | ........................ 348/143 |
| 2010/0097475 A1 | 4/2010 | Yokomitsu | |

(Continued)

FOREIGN PATENT DOCUMENTS

| | | |
|---|---|---|
| JP | 2006-244140 | 9/2006 |
| JP | 2006-276969 | 10/2006 |

(Continued)

OTHER PUBLICATIONS

International Search Report in PCT/JP2012/006504, mail date is Dec. 18, 2012.

*Primary Examiner* — Bernard Krasnic
*Assistant Examiner* — Pinalben Patel
(74) *Attorney, Agent, or Firm* — Greenblum & Bernstein P.L.C.

(57) ABSTRACT

A thronging determination device for determining occurrence of a thronging state in which persons are gathered locally, includes an image receiving unit that receives a moving image, an image dividing unit that divides an input image received by the image receiving unit into local regions, and a degree-of-congestion estimating unit that judges the degree of congestion in plural ones of the local regions. If the degree-of-congestion estimating unit judges that the degree of congestion in the plural ones of the local regions is lower than a prescribed value, a thronging determination is performed using local regions that are smaller in number than the local regions that have been used in estimating the degree of congestion.

14 Claims, 18 Drawing Sheets

(56) References Cited

U.S. PATENT DOCUMENTS

2010/0177963 A1 7/2010 Yokomitsu et al.
2010/0271494 A1* 10/2010 Miyasako .................. 348/208.1
2014/0003728 A1* 1/2014 Aoki et al. .................... 382/218
2015/0077638 A1* 3/2015 Higashi et al. ................ 348/699

FOREIGN PATENT DOCUMENTS

| JP | 2007-264706 | 10/2007 |
|----|-------------|---------|
| JP | 2008-219570 | 9/2008 |
| JP | 2009-110152 | 5/2009 |
| JP | 2011-248836 | 12/2011 |

* cited by examiner

▩ : WITH HUMAN MOTION
▦ : WITHOUT HUMAN MOTION
☐ : HUMAN-ABSENT

▩ : WITH HUMAN MOTION
▦ : WITHOUT HUMAN MOTION
☐ : HUMAN-ABSENT

VARIANCE: SMALL

VARIANCE: LARGE

▨ : WITH HUMAN MOTION

▦ : WITHOUT HUMAN MOTION

☐ : HUMAN-ABSENT (DEGREE OF CONGESTION ((%)) = ( ▨ + ▦ ) / (NUMBER OF ALL LOCAL REGIONS)

THRONGING DETERMINATION DEVICE AND THRONGING DETERMINATION METHOD

CROSS REFERENCE TO RELATED APPLICATION

This application is a continuation of PCT application No. PCT/JP2012/006504, which was filed on Oct. 10, 2012 based on Japanese Patent Application (No. 2011-229889) filed on Oct. 19, 2011, the contents of which are incorporated herein by reference. Also, all the references cited herein are incorporated as a whole.

BACKGROUND

1. Technical Field

The present invention relates to a thronging determination device and a thronging determination method for determining occurrence of a throng (or flock) which means a local gathering of persons.

2. Background Art

Among devices for detecting a violent act of a person is one disclosed in JP-A-2006-276969. The violent act detecting device disclosed in JP-A-2006-276969 is equipped with a motion calculating means for calculating movements, and their magnitudes, of individual points of each of two images taken at different time points separated by a prescribed time with a camera installed inside an elevator car and calculating a dispersion of at least one of directions and magnitudes of movements of a person on the basis of directions and magnitudes of movements at the respective points, and a violent act determining means for determining occurrence of a violent act by comparing the dispersion of the movements of the person and a human violence judgment threshold value.

SUMMARY

However, since the above-described violent act detecting device disclosed in JP-A-2006-276969 assumes the inside of an elevator car, it is not provided with any measure for preventing an erroneous detection at such a place as a bustling street which would always be crowded with people. As such, this device has a problem that it cannot detect a violent act accurately at such places. Furthermore, this conventional violent act detecting device does not address detection of a motionless throng such as people hanging out, and hence is associated with a problem that it cannot detect a motionless throng such as people hanging out.

The term "throng" as used herein means a local gathering of persons and is not a mere high-density collection of persons. For example, the term "throng" as used herein encompasses minors hanging out as found frequently in parks etc. at night (see FIG. 17) and a crowd (including curious onlookers) caused by an abnormal incident such as a fight (see FIG. 18).

The present invention has been made in the above circumstances, and an object of the invention is therefore to provide a thronging determination device and a thronging determination method which can determine, with high accuracy, occurrence of a throng at such a place as a bustling street which would always be crowded with people and can determine occurrence of a motionless throng such as people hanging out.

The invention provides a thronging determination device comprising image receiving means for receiving a moving image; image dividing means for dividing an input image received by the image receiving means into local regions; and thronging determination window generating means for generating a thronging determination window consisting of plural ones of the local regions, wherein a thronging state in the input image is judged on the basis of a motion proportion which is the ratio of the number of local regions judged to have motion to the number of local regions included in the thronging determination window and a human proportion which is the ratio of the number of local regions judged to contain a person to the number of local regions included in the thronging determination window.

In this configuration, an input image is divided into local regions and a thronging determination window consisting of plural local regions is generated. And a thronging state of the input image is judged on the basis of a motion proportion which is the ratio of the number of local regions with motion to the number of local regions included in the generated thronging determination window and a human proportion which is the ratio of the number of local regions containing a person to the number of local regions included in the generated thronging determination window. As a result, the thronging determination device can determine, with high accuracy, occurrence of a throng at such a place as a bustling street which would always be crowded with people and determine occurrence of a motionless throng such as people hanging out.

The above configuration may be such that the whole of the input image is scanned using the thronging determination window and thronging-positive regions that have been judged to have a throng are integrated together.

The above configuration may be such that a first thronging continuation state is updated if the motion proportion is larger than or equal to a prescribed value and a flow variance of the local regions that have been judged to have motion is larger than or equal to a prescribed value, that a second thronging continuation state is updated if the motion proportion is smaller than the prescribed value and the human proportion is larger than or equal to a prescribed value, and that a thronging state of the input image is judged on the basis of the first thronging continuation state and the second thronging continuation state that are obtained from the input image.

In this configuration, the first thronging continuation state is updated if the motion proportion is larger than or equal to the prescribed value and the flow variance of the local regions that have been judged to have motion is larger than or equal to the prescribed value, and the second thronging continuation state is updated if the motion proportion is smaller than the prescribed value and the human proportion is larger than or equal to the prescribed value. And a thronging state of the input image is judged on the basis of the first thronging continuation state and the second thronging continuation state that are obtained from the input image. As a result, the thronging determination device can determine, with high accuracy, occurrence of a throng at such a place as a bustling street which would always be crowded with people and determine occurrence of a motionless throng such as people hanging out.

The above configuration may be such that the flow variance is a variance that is calculated on the basis of directions of motion vectors of the respective local regions judged to have motion.

The above configuration may be such that the first thronging continuation state is indicated by the count of a first counter, that the count of the first counter is incremented if the flow variance of the local regions judged to have motion is larger than or equal to the prescribed value and decremented if the flow variance of the local regions judged to have motion is smaller than the prescribed value, and that it is judged that a throng exists in the input image if the count of the first counter is larger than or equal to a prescribed value.

The above configuration may be such that the second thronging continuation state is indicated by the count of a second counter, that the count of the second counter is incremented if the human proportion is larger than or equal to the prescribed value, and decremented if the human proportion is smaller than the prescribed value, and that it is judged that a throng exists in the input image if the count of the second counter is larger than or equal to a prescribed value.

The invention also provides a thronging determination method for judging a thronging state in an input image obtained from a moving image, comprising an image receiving step of receiving a moving image; an image dividing step of dividing an input image received by the image receiving step into local regions; and a thronging determination window generating step of generating a thronging determination window consisting of plural ones of the local regions, wherein a thronging state in the input image is judged on the basis of a motion proportion which is the ratio of the number of local regions judged to have motion to the number of local regions included in the thronging determination window and a human proportion which is the ratio of the number of local regions judged to contain a person to the number of local regions included in the thronging determination window.

In the above method, an input image is divided into local regions and a thronging determination window consisting of plural local regions is generated. And a thronging state of the input image is judged on the basis of a motion proportion which is the ratio of the number of local regions with motion to the number of local regions included in the generated thronging determination window and a human proportion which is the ratio of the number of local regions containing a person to the number of local regions included in the generated thronging determination window. As a result, the thronging determination method can determine, with high accuracy, occurrence of a throng at such a place as a bustling street which would always be crowded with people and determine occurrence of a motionless throng such as people hanging out.

The invention makes it possible to determine, with high accuracy, occurrence of a throng at such a place as a bustling street which would always be crowded with people and to determine occurrence of a motionless throng such as people hanging out.

DETAILED DESCRIPTION OF THE EXEMPLARY EMBODIMENTS

Preferred embodiments for carrying out the present invention will be hereinafter described in detail with reference to the drawings.

Embodiment 1

Figure 1:
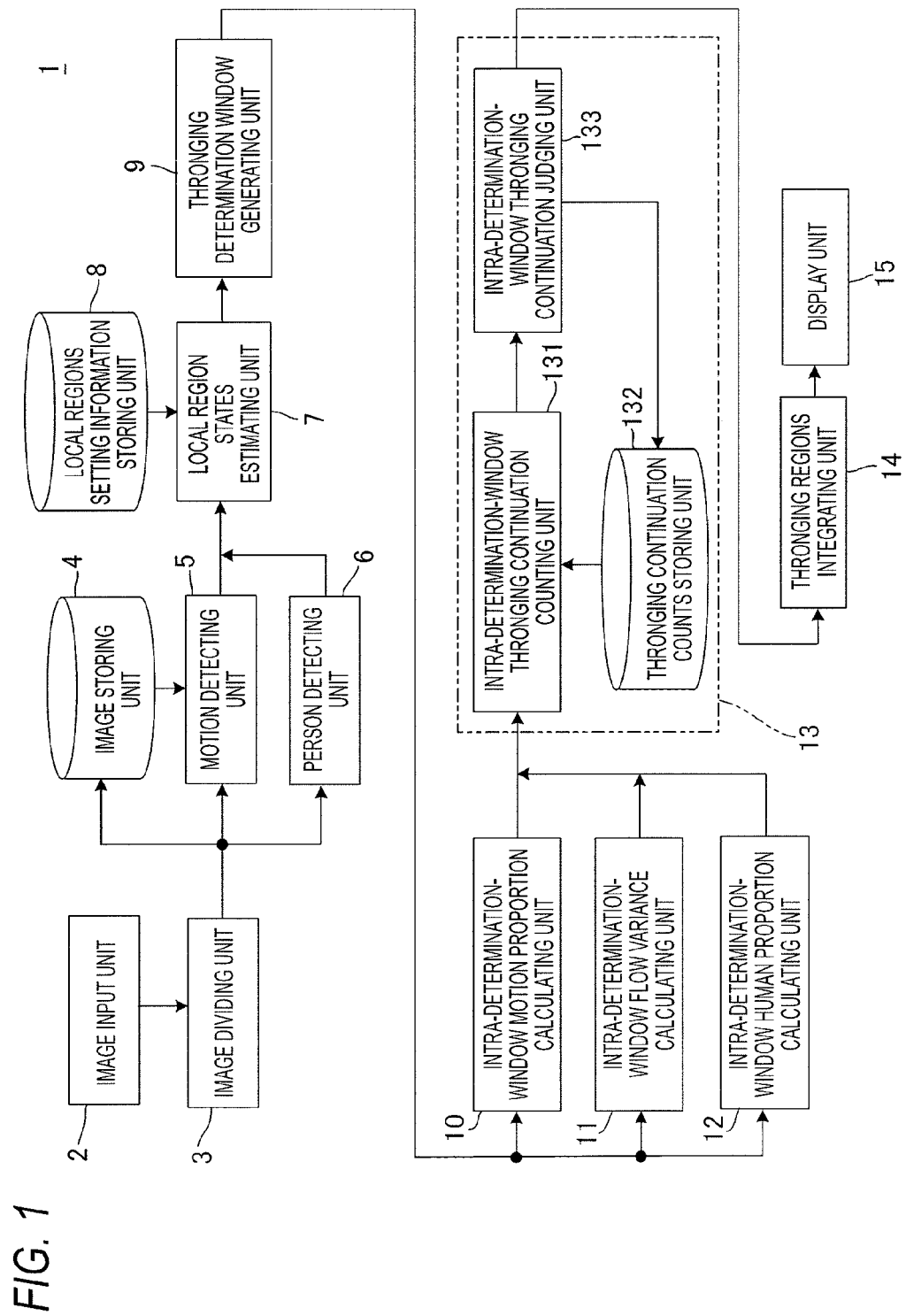
FIG. 1 is a block diagram showing a general configuration of a thronging determination device according to a first embodiment of the present invention.

FIG. 1 is a block diagram showing a general configuration of a thronging determination device according to a first embodiment of the invention. The thronging determination device 1 according to this embodiment is configured using an ordinary computer. That is, it is configured as a computer that is equipped with a volatile memory such as a RAM, a nonvolatile memory such as a ROM, a large-capacity storage device such as a hard disk drive or an SSD (solid-state drive), and other devices. It goes without saying that the thronging determination device 1 may have a dedicated hardware configuration rather than the configuration using an ordinary computer.

As shown in FIG. 1, the thronging determination device 1 according to this embodiment is equipped with an image input unit 2, an image dividing unit 3, an images storing unit 4, a motion detecting unit 5, a person detecting unit 6, a local region states estimating unit 7, a local regions setting information storing unit 8, a thronging determination window generating unit 9, an intra-determination-window motion proportion calculating unit 10, an intra-determination-window flow variance calculating unit 11, an intra-determination-window human proportion calculating unit 12, an intra-determination-window thronging determining unit 13, a throng regions integrating unit 14, and a display unit 15.

Figure 2:
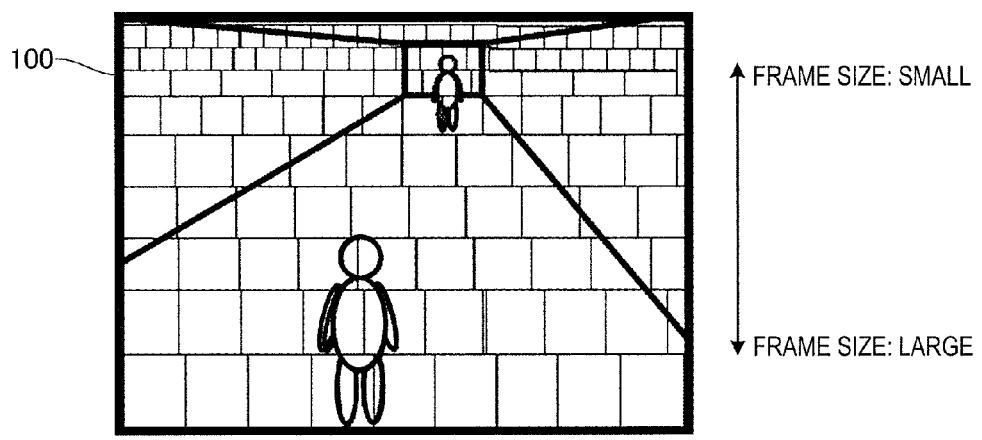
FIG. 2 illustrates a specific example of division of an image into local regions in the thronging determination device of FIG. 1.

The image input unit 2 receives a moving image taken by a camera. The image dividing unit 3 divides an input image into local regions. FIG. 2 illustrates a specific example of division into plural local regions (individual divisional rectangles shown in FIG. 2). As shown in FIG. 2, an input image 100 is divided into local regions according to human sizes. As a result, the local region becomes larger as the human size increases.

Returning to FIG. 1, the images storing unit 4 stores the local regions (divisional images) produced by the image dividing unit 3. The person detecting unit 6 detects whether or not each local region (divisional image) contains a person using human feature quantities. The motion detecting unit 5 detects movements in the respective local regions (divisional images) on the basis of the divisional images stored by the images storing unit 4 and new divisional images supplied from the image dividing unit 3.

Figure 3A:
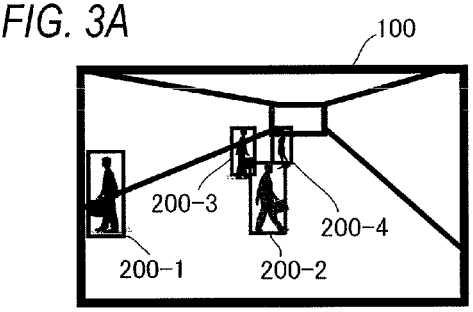
FIGS. 3A-3E illustrate specific examples of human detection, motion detection, and integration of them in the thronging determination device of FIG. 1.
Figure 3B:
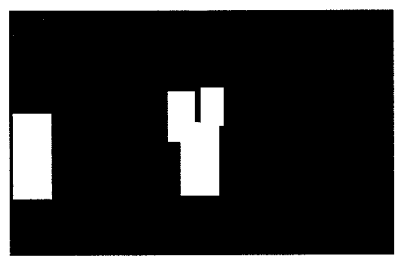
Figure 3C:
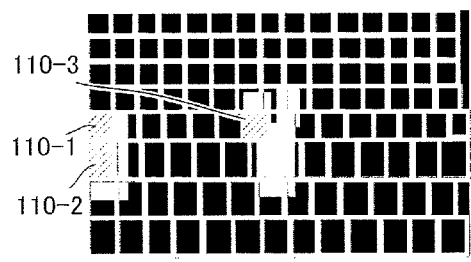

FIGS. 3A-3E illustrate specific examples of human detection, motion detection, and integration of them. To perform human detection, first, persons are detected in the input image 100 (see FIG. 3A). FIG. 3A shows that four persons 200-1 to 200-4 are detected. After the human detection, mapping is performed, whereby a binary, black-and-white image is obtained (see FIG. 3B). After obtaining the binary image, it is judged that only four local regions of each of which belong to a white region should be kept tentatively (see FIG. 3C). In FIG. 3C, the four local regions of each of which belong to a white region are three local regions 110-1 to 110-3.

Figure 3D:
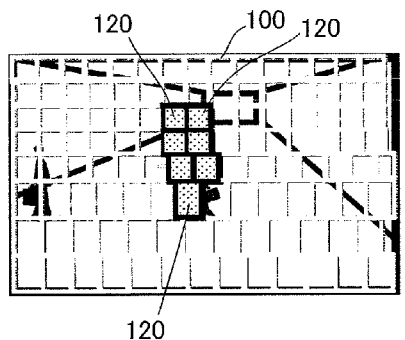
Figure 3E:
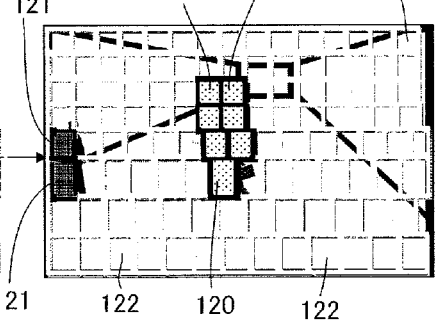

On the other hand, in the motion detection, every local region is checked for motion. FIG. 3D shows that human motion is found in local regions 120. As shown in FIG. 3E, integrating the human detection and the motion detection makes it possible to determine not only a local region with human motion but also a local region where a person exists but is not in motion. In this example, no human motion is found in local regions 121 and no person is found in local regions 122 (human-absent local regions).

Figure 4:
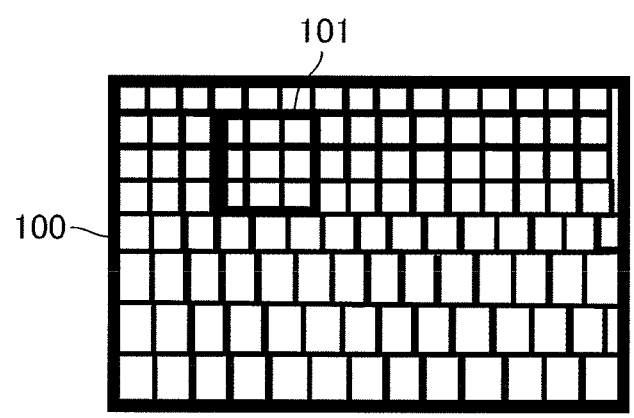
FIG. 4 illustrates a specific example thronging determination window used in the thronging determination device of FIG. 1.

Returning to FIG. 1, the local region states estimating unit 7 estimates states of the local regions (divisional images) on the basis of local regions setting information that is stored by the local regions setting information storing unit 8. The thronging determination window generating unit 9 generates a thronging determination window which is formed by plural local regions. A thronging determination window is formed by X×Y local regions in accordance with their sizes. FIG. 4 illustrates a specific example thronging determination window 101 which consists of 3×3 local regions.

Returning to FIG. 1, the intra-determination-window motion proportion calculating unit 10 calculates a motion proportion which is obtained from the ratio of the number of local regions that have been judged to have motion by the motion detecting unit 5 to the number of local regions included in the thronging determination window generated by the thronging determination window generating unit 9. The intra-determination-window flow variance calculating unit 11 calculates a flow variance on the basis of the directions of motion vectors of the local regions that have been judged to have motion among the local regions included in the thronging determination window generated by the thronging determination window generating unit 9. The intra-determination-window human proportion calculating unit 12 calculates a human proportion which is obtained from the ratio of the number of local regions that have been judged to contain a person by the person detecting unit 6 to the number of local regions included in the thronging determination window generated by the thronging determination window generating unit 9.

Figure 5A:
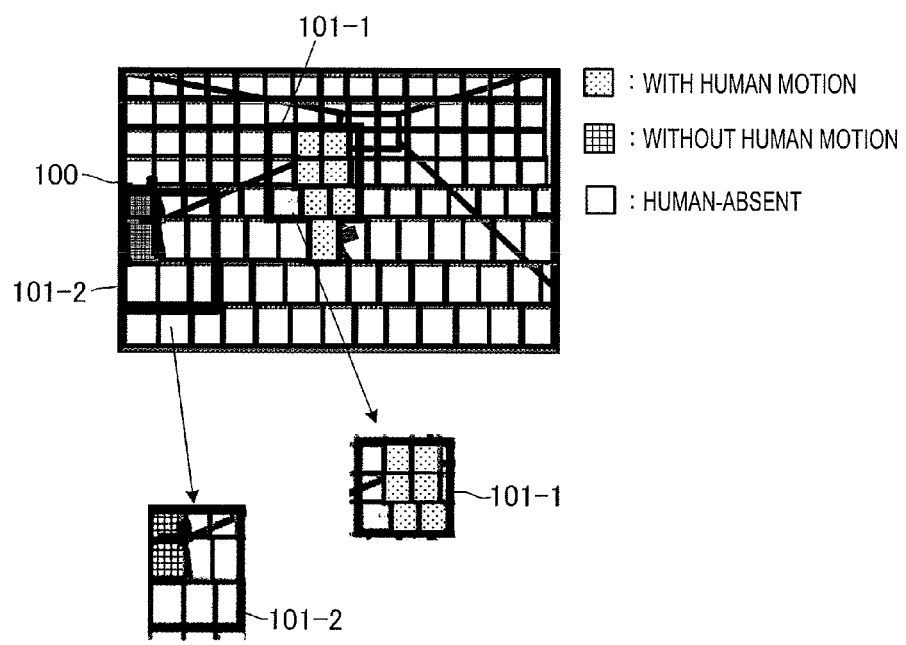
FIGS. 5A-5C schematically illustrate how to calculate a motion proportion, a human proportion, and a flow variance in the thronging determination device of FIG. 1.
Figure 5B:
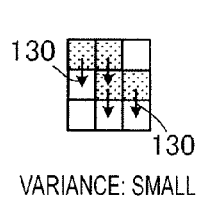
Figure 5C:
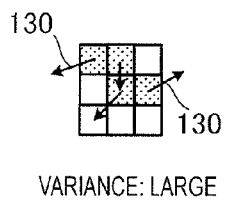

FIGS. 5A-5C schematically illustrate how to calculate a motion proportion, a human proportion, and a flow variance. In this example, since six of the nine local regions of a thronging determination window 101-1 are local regions with human motion (see FIG. 5A), the motion proportion is calculated to be 66.6% (6/9). Since two of the nine local regions of a thronging determination window 101-2 are local regions without human motion (see FIG. 5A), the human proportion is calculated to be 22.2% (2/9). A flow variance is obtained by calculating a variance of movement directions of local regions with human motion. FIG. 5B shows a case that the variance is small (the directions of vectors 130 are approximately the same). FIG. 5C shows a case that the variance is large (the directions of vectors 130 vary widely). A throng with motion is defined as a throng in which the directions of movements are not uniform and hence have a large variance.

Figure 6A:
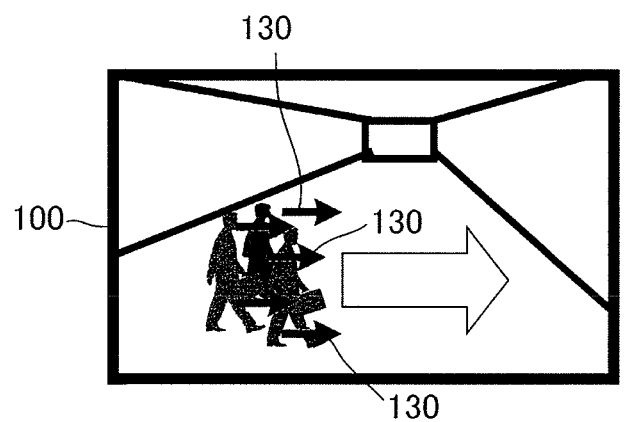
FIGS. 6A and 6B illustrate specific examples of motion detection using optical flow in the thronging determination device of FIG. 1.
Figure 6B:
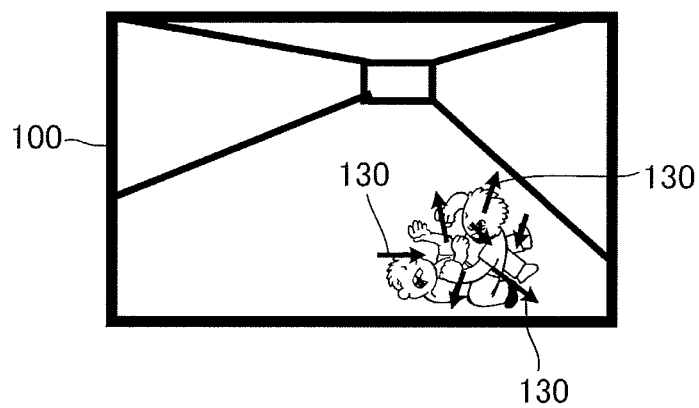

Movement directions can be detected using optical flow. FIGS. 6A and 6B illustrate specific examples of motion detection using optical flow. FIG. 6A shows a normal scene in which the directions of vectors 130 are approximately the same. In this case, since the vectors 130 are approximately in the same direction, the variance is small. On the other hand, FIG. 6B shows a fight scene in which vectors 130 are low in uniformity in both of time and space. In this case, the vectors 130 vary widely and have a large variance.

Returning to FIG. 1, the intra-determination-window thronging determining unit 13 determines whether or not a throng exists in each thronging determination window. The intra-determination-window thronging determining unit 13 judges a thronging state of an input image on the basis of motion proportions, flow variances, and human proportions in the thronging determination window. The intra-determination-window thronging determining unit 13 is equipped with an intra-determination-window thronging continuation counting unit 131, a thronging continuation counts storing unit 132, and an intra-determination-window thronging continuation judging unit 133. The intra-determination-window thronging continuation counting unit 131, the thronging continuation counts storing unit 132, and the intra-determination-window thronging continuation judging unit 133 perform processing for moving a thronging determination window with respect to the input image to judge whether or not a throng exists in the thronging determination window.

The intra-determination-window thronging determining unit 13 updates a first thronging continuation state if the motion proportion is larger than or equal to a prescribed value and the flow variance of local regions that have been judged to have motion is larger than or equal to a prescribed value, and updates a second thronging continuation state if the motion proportion is smaller than the prescribed value and the human proportion is larger than or equal to a prescribed value. And the intra-determination-window thronging determining unit 13 judges a thronging state of the input image on the basis of the first thronging continuation state and the second thronging continuation state. The intra-determination-window thronging continuation counting unit 131 is equipped with a thronging continuation counter C1 (first counter; not shown) and a thronging continuation counter C2 (second counter; not shown).

The first thronging continuation state is indicated by the count of the thronging continuation counter C1 of the intra-determination-window thronging continuation counting unit 131. The count of the thronging continuation counter C1 of the intra-determination-window thronging continuation counting unit 131 is incremented if the flow variance of local regions judged to have motion is larger than or equal to the prescribed value, and decremented if the flow variance of local regions judged to have motion is smaller than the prescribed value. It is judged that a throng exists in the input image if the count of the thronging continuation counter C1 is larger than or equal to a prescribed value. The second thronging continuation state is indicated by the count of the thronging continuation counter C2 of the intra-determination-window thronging continuation counting unit 131. The count of the thronging continuation counter C2 of the intra-determination-window thronging continuation counting unit 131 is incremented if the human proportion is larger than or equal to the prescribed value, and decremented if the human proportion is smaller than the prescribed value. It is judged that a throng exists in the input image if the count of the thronging continuation counter C2 is larger than or equal to a prescribed value.

Figure 7B:
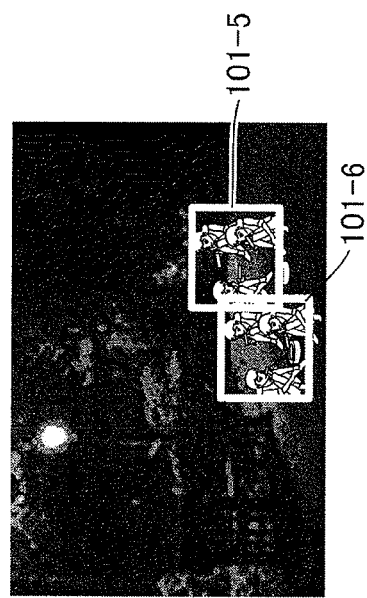
FIGS. 7A-7C illustrate a specific example of integration of thronging-positive regions in the thronging determination device of FIG. 1.
Figure 7C:
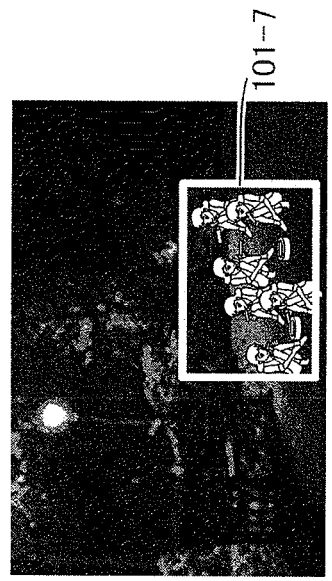
Figure 7A:
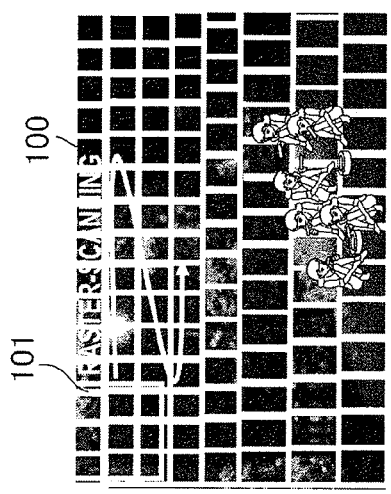

If plural thronging-positive regions are found in a thronging determination process of the intra-determination-window thronging determining unit 13, the throng regions integrating unit 14 integrates them into a single region. FIGS. 7A-7C illustrate a specific example of integration of thronging-positive regions. As shown in FIG. 7A, a throng detection process is executed by raster-scanning the whole of an input image 100 using a thronging determination window having a variable block size. If two detection frames 101-5 and 101-6 are obtained (see FIG. 7B) as a result of a throng detection process, the two detection frames 101-5 and 101-6 are integrated into one detection frame 101-7 (see FIG. 7C).

Figure 8B:
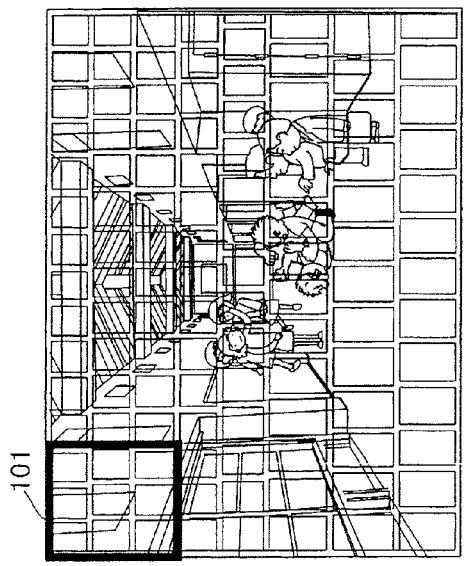
FIGS. 8A-8C illustrate another specific example of integration of thronging-positive regions in the thronging determination device of FIG. 1.
Figure 8C:
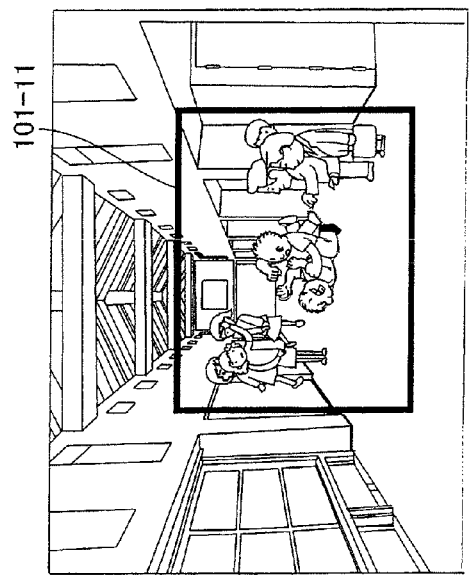
Figure 8A:
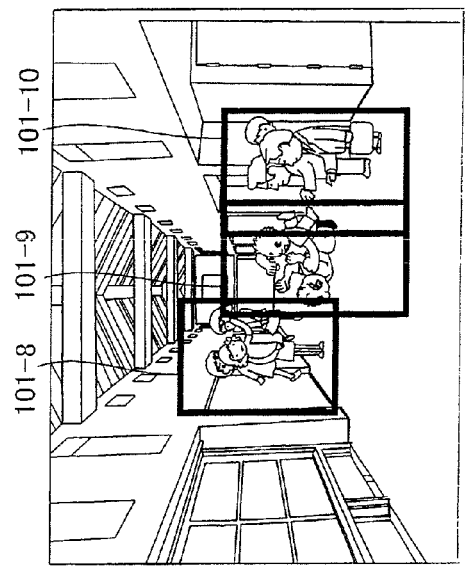

FIGS. 8A-8C illustrate another specific example of integration of thronging-positive regions. As shown in FIG. 8A, an input image taken has plural persons without motion around plural persons in motion. This input image is raster-scanned in order starting from its top-left position using a thronging determination window 101.

FIG. 8B shows a result of the raster scan performed using the thronging determination window 101. Detection frames without human motion 101-8 and 101-10 and detection frames with human motion 101-9 are detected.

FIG. 8C shows a result of integration of the detection frames. A detection frame 101-11 is obtained as a result of integration of the detection frames 101-9 containing plural persons in motion and the detection frames 101-8 and 101-10 containing persons who surround the plural persons in motion and are not moving.

An input image is divided into local regions according to human sizes. Although in the embodiment each local region is given a size that is obtained when a square the length whose sides are equal to the height of a person is divided into 3×3 parts, the division number of a square may be larger or smaller than 9.

It is noted that the English term "to flock together" may be used for expressing the phenomenon of thronging to which the invention is directed.

Returning to FIG. 1, the display unit 15 displays a thronging-positive region(s) that is output from the throng regions integrating unit 14.

Next, a description will be made of how the thronging determination device 1 according to the first embodiment operates.

Figure 9:
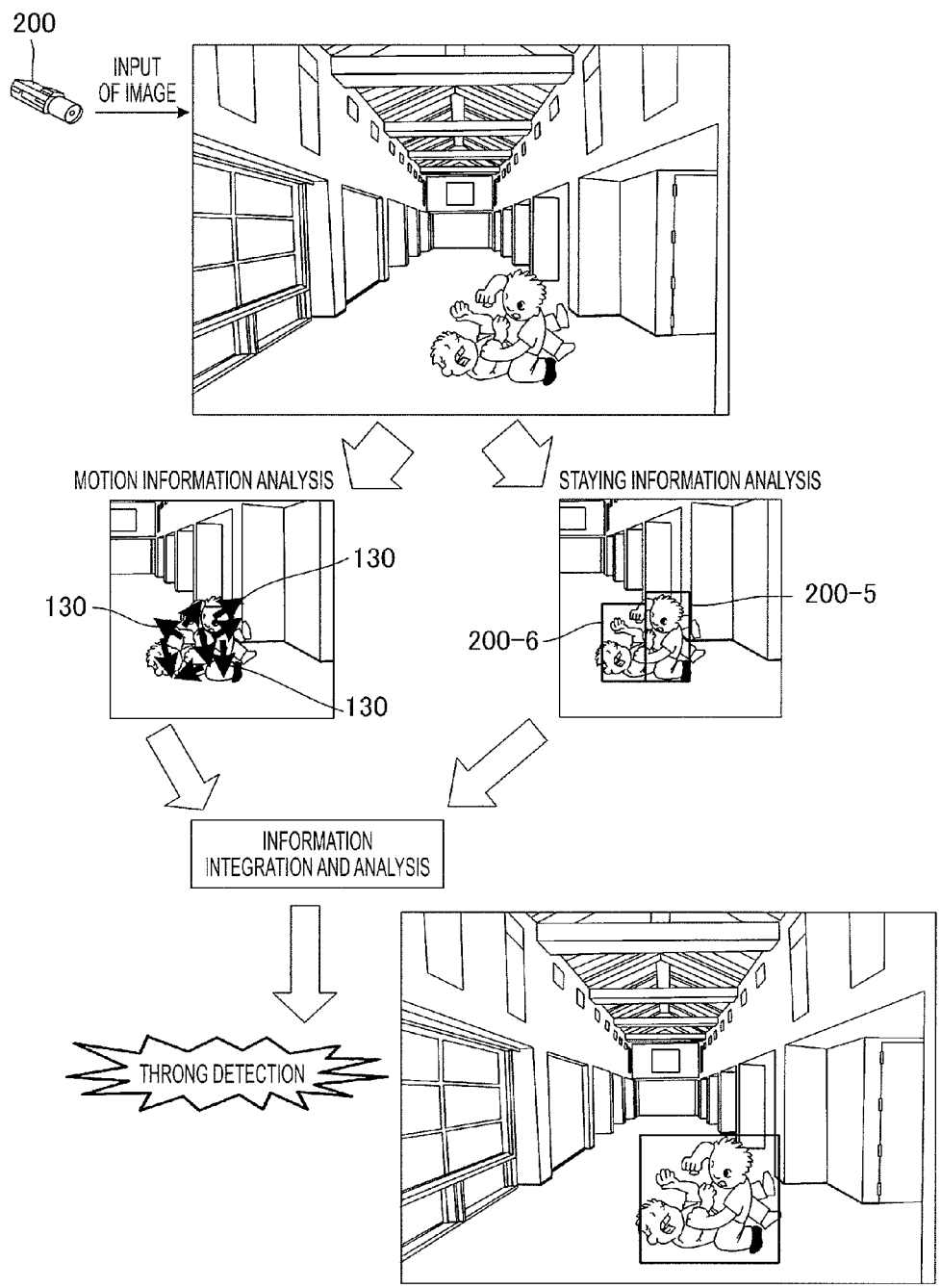
FIG. 9 illustrates a throng detection algorithm employed in the thronging determination device of FIG. 1.

FIG. 9 illustrates a throng detection algorithm employed in the thronging determination device 1 according to the first embodiment. As shown in FIG. 9, an image taken by a camera 200 is received, it is subjected to a motion information analysis and a staying information analysis, and pieces of resulting information of these analyses are integrated together and analyzed for throng detection. Arrows 130 that are used for describing the motion information analysis represent flows (vectors) that indicate movements. Rectangular frames 200-5 and 2006 that are used for describing the staying information analysis are human position detection frames.

Figure 10:
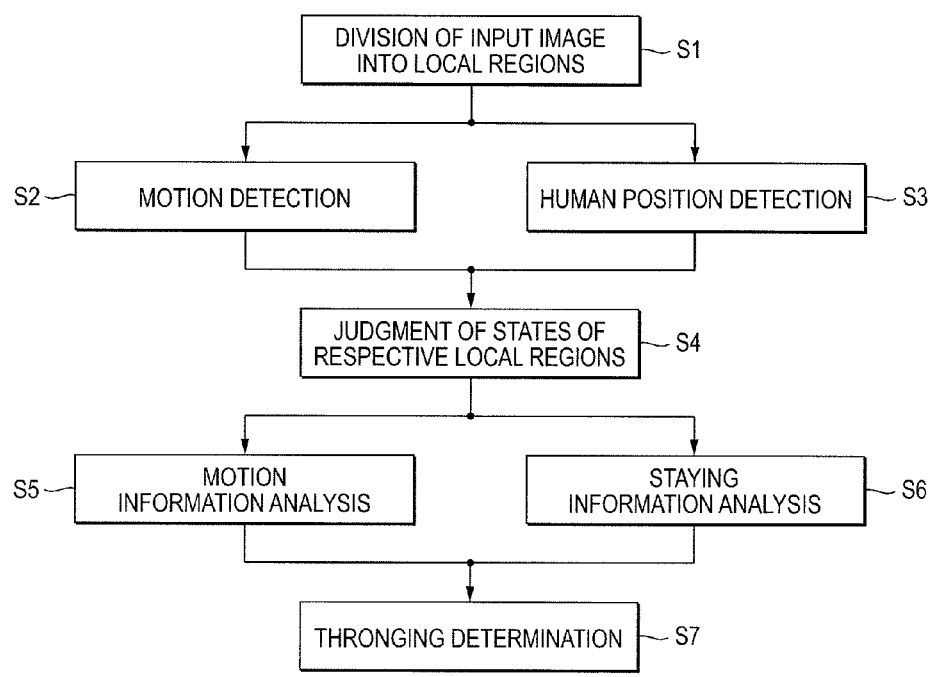
FIG. 10 is a rough flowchart of a main process of the thronging determination device of FIG. 1.

FIG. 10 is a rough flowchart of a main process of the thronging determination device 1 according to the first embodiment. Referring to FIG. 10, first, at step S1, an input image is divided into local regions. At step S2, movements in the respective divisional images (local regions) are detected. At step S3, it is detected whether or not each of the divisional images (local regions) contains a person. After the motion detection and the human detection, at step S4 states of the respective location regions of the input image are judged. At step S5, a motion information analysis and a staying information analysis are performed at steps S5 and S6, respectively, on the basis of results of step S4. At step S7, thronging determination is made on the basis of analysis results of steps S5 and S6.

Figure 11:
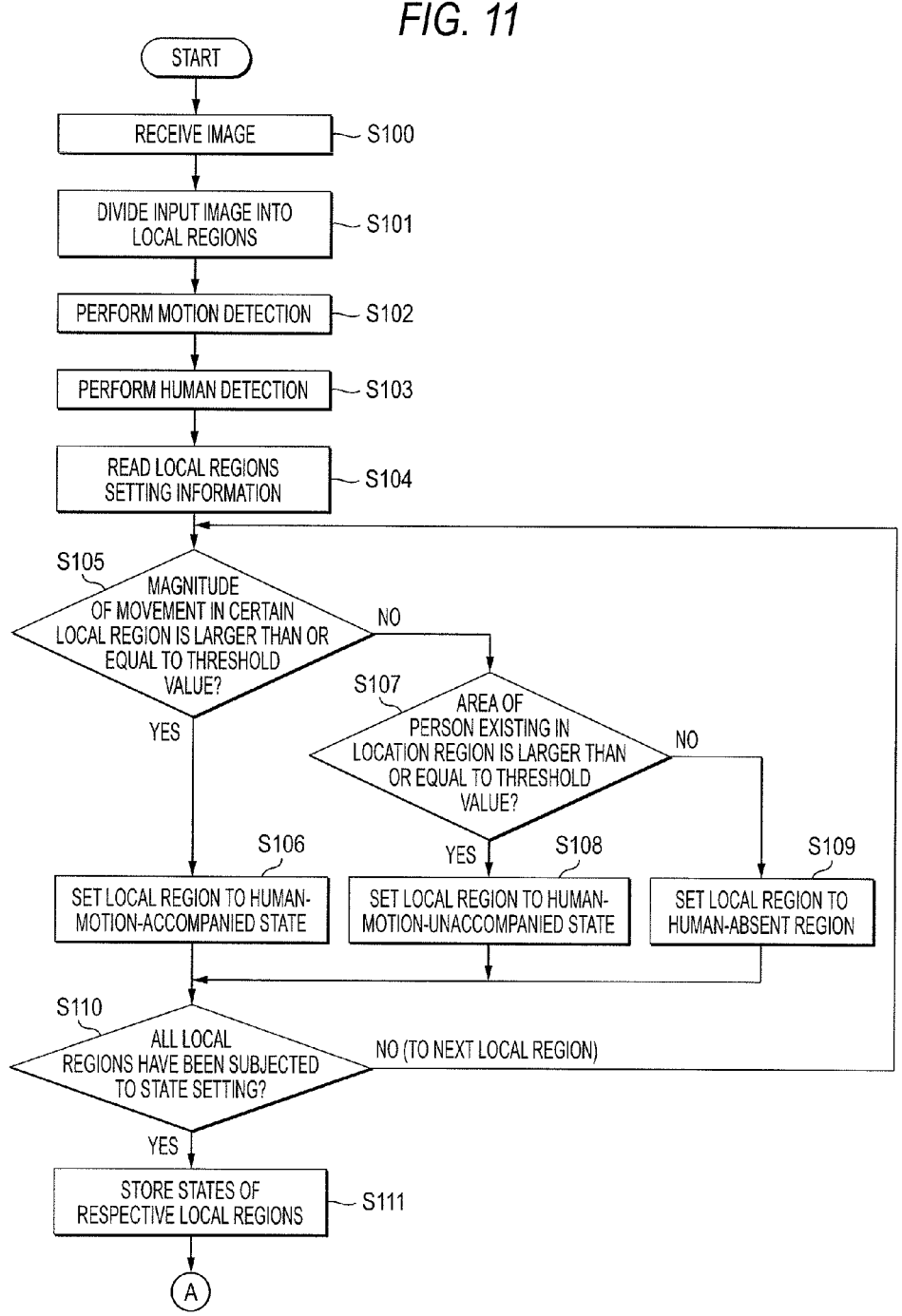
FIG. 11 is a detailed flowchart of a first part of the main process of the thronging determination device of FIG. 1.
Figure 12:
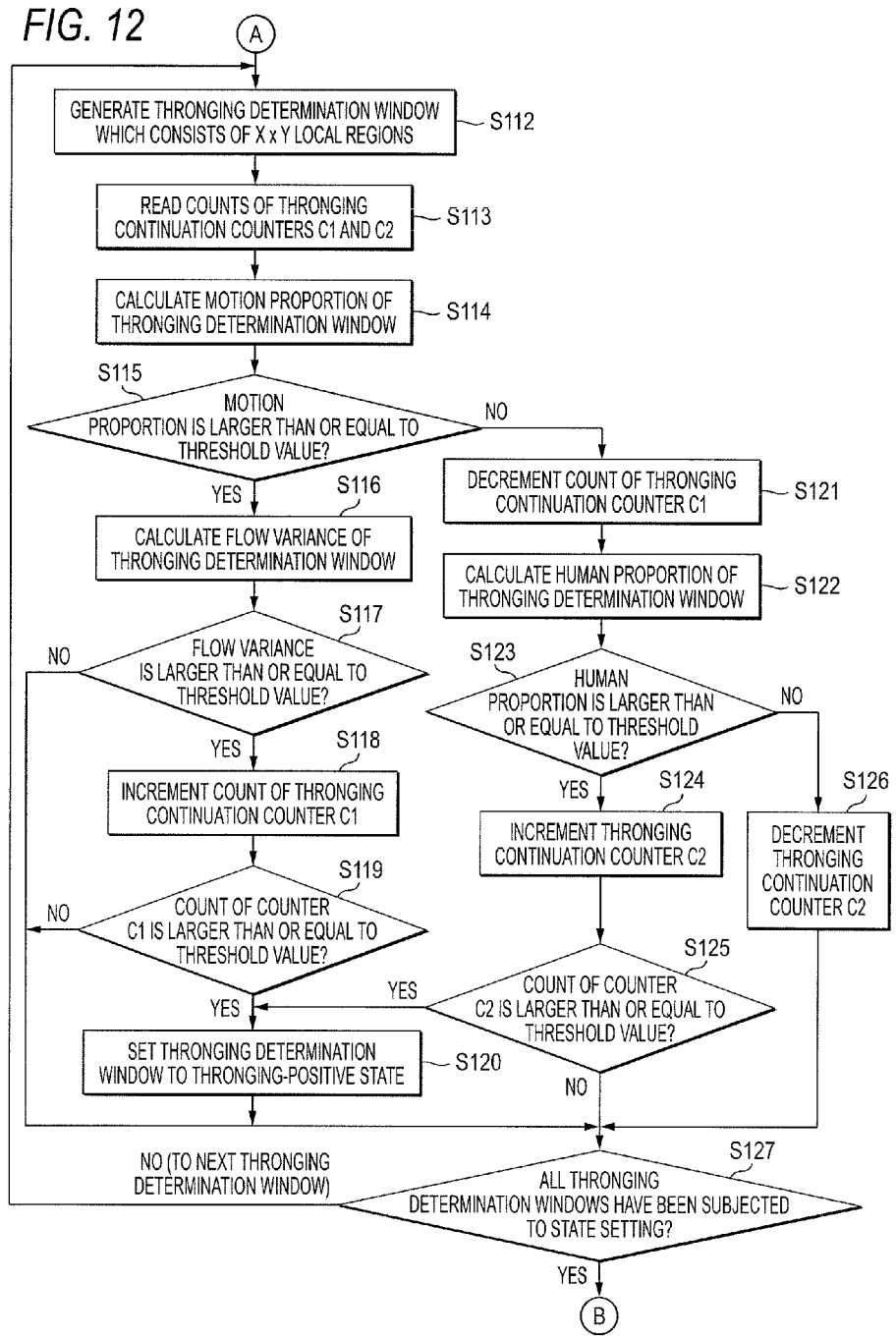
FIG. 12 is a detailed flowchart of a second part of the main process of the thronging determination device of FIG. 1.
Figure 13:
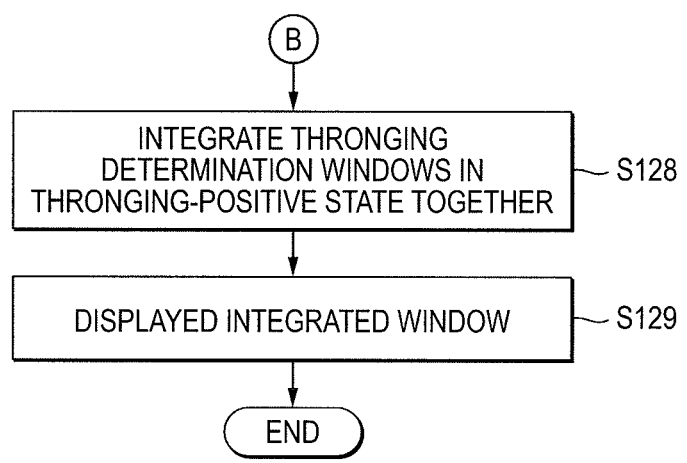
FIG. 13 is a detailed flowchart of a third part of the main process of the thronging determination device of FIG. 1.

FIGS. 11-13 are detailed flowcharts of the main process of the thronging determination device 1 according to the first embodiment. Referring to FIGS. 11-13, first, at step S100, the image input unit 2 receives an image taken by the camera 200 (see FIG. 9). At step S101, the image dividing unit 3 divides the input image into local regions. At step S102, the motion detecting unit 5 performs motion detection. At step S103, the person detecting unit 6 performs human detection. At step S104, the local region states estimating unit 7 reads local regions setting information from the local regions setting information storing unit 8.

At step S105, the local region states estimating unit 7 judges whether the magnitude of a movement in a local region is larger than or equal to a threshold value. If judging that the magnitude of the movement in the local region is larger than or equal to the threshold value (S105: yes), at step S106 the local region states estimating unit 7 sets this local region to a human-motion-accompanied state. On the other hand, if judging that the magnitude of the movement in the local region is smaller than the threshold value (S105: no), then at step S107 the local region states estimating unit 7 judges whether the area of the person existing in the local region is larger than or equal to a threshold value. If judging that the area of the person existing in the local region is larger than or equal to the threshold value (S107: yes), at step S108 the local region states estimating unit 7 sets this local region to a human-motion-unaccompanied state. On the other hand, if judging that the area of the person existing in the local region is smaller than the threshold value (S107: no), at step S109 the local region states estimating unit 7 sets this local region to a human-absent state.

After execution of step S106, S108, or S109, the local region states estimating unit 7 judges at step S110 whether or not all of the local regions have been subjected to state setting. If not all of the local regions have been subjected to state setting yet (S110: no), the process returns to step S105 to judge whether the magnitude of a movement in the next local region is larger than or equal to the threshold value. If all of the local regions have been subjected to state setting (S110: yes), at step S111 the thus-set states of the respective local regions are stored.

At step S112, the thronging determination window generating unit 9 generates a thronging determination window which consists of X×Y local regions. At step S113, the intra-determination-window thronging determining unit 13 reads the counts of the thronging continuation counters C1 and C2 corresponding to the generated thronging determination window. At step S114, the intra-determination-window motion proportion calculating unit 10 calculates a motion proportion of the thronging determination window. At step S115, the intra-determination-window thronging determining unit 13 judges whether the calculated motion proportion is larger than or equal to a threshold value. If the motion proportion is larger than or equal to the threshold value (S115: yes), at step S116 the intra-determination-window flow variance calculating unit 11 calculates a flow variance of the thronging determination window.

At step S117, the intra-determination-window thronging determining unit 13 judges whether the calculated flow variance is larger than or equal to a threshold value. If judging that the flow variance is larger than or equal to the threshold value (S117: yes), at step S118 the intra-determination-window thronging determining unit 13 increments the count of the thronging continuation counter C1. At step S119, the intra-determination-window thronging determining unit 13 judges whether the count of the thronging continuation counter C1 is larger than or equal to a threshold value. If judging that count of the thronging continuation counter C1 is larger than or equal to the threshold value (S119: yes), at step S120 the intra-determination-window thronging determining unit 13 sets the thronging determination window to a thronging-positive state.

On the other hand, if judging that the motion proportion of the thronging determination window is smaller than the threshold value (S115: no), at step S121 the intra-determination-window thronging determining unit 13 decrements the count of the thronging continuation counter C1. At step S122, the intra-determination-window human proportion calculating unit 12 calculates a human proportion of the thronging determination window. At step S123, the intra-determination-window thronging determining unit 13 judges whether the calculated human proportion is larger than or equal to a threshold value. If judging that the calculated human proportion is larger than or equal to the threshold value (S123: yes), at step S124 the intra-determination-window thronging determining unit 13 increments the count of the thronging continuation counter C2. At step S125, the intra-determination-window thronging determining unit 13 judges whether the count of the thronging continuation counter C2 is larger than or equal to a threshold value. If judging that the count of the thronging continuation counter C2 is larger than or equal to the threshold value (S125: yes), at step S120 the intra-determination-window thronging determining unit 13 sets the thronging determination window to a thronging-positive state.

If judging that the human proportion is smaller than the threshold value (S123: no), at step S126 the intra-determination-window thronging determining unit 13 decrements the count of the thronging continuation counter C2.

If the judgment result of step S117, S119, or S125 is negative or step S120 or S126 has been executed, at step S127 the intra-determination-window thronging determining unit 13 judges whether or not all of thronging determination windows have been subjected to state setting. If not all of thronging determination windows have been subjected to state setting yet (S127: no), the process returns to step S112 to execute steps S112-S126 again for the next thronging determination window. If all of thronging determination windows have been subjected to state setting (S127: yes), at step S128 the throng regions integrating unit 14 integrates thronging determination windows each being in the thronging-positive state together. At state S129, an integrated window is displayed. Then the process is finished.

As described above, in the thronging determination device 1 according to the first embodiment, an input image is divided into local regions and whether or not each divisional image (local region) contains a person is detected by detecting a movement in the divisional image (local region). Furthermore, a thronging determination window consisting of plural local regions is generated and a thronging state of the input image is judged on the basis of a motion proportion that is obtained from the ratio of the number of local regions with motion to the number of local regions included in the generated thronging determination window and a human proportion that is obtained from the ratio of the number of local regions containing a person to the number of local regions included in the generated thronging determination window. As a result, the thronging determination device 1 can determine, with high accuracy, occurrence of a throng at such a place as a bustling street which would always be crowded with people and determine occurrence of a motionless throng such as people hanging out.

It is possible to deliver a program that describes the process to be executed by the thronging determination device 1 according to the first embodiment in such a manner that it is stored in a storage device such as a magnetic disk, an optical disc, a magneto-optical disc, or a semiconductor memory or an electric communication network such as the Internet is used.

Embodiment 2

Figure 14:
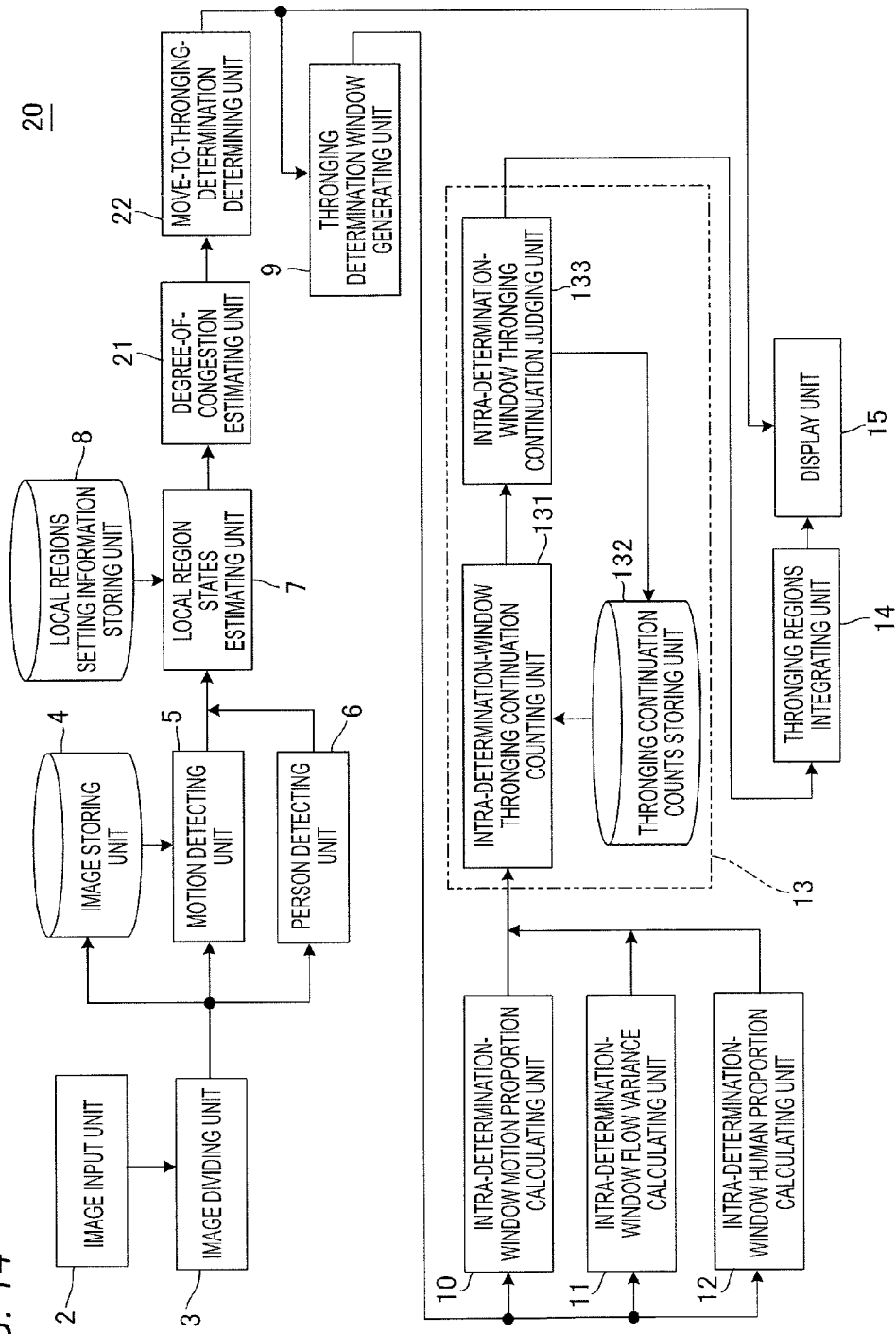
FIG. 14 is a block diagram showing a general configuration of a thronging determination device according to a second embodiment of the invention.

FIG. 14 is a block diagram showing a general configuration of a thronging determination device according to a second embodiment of the invention. In FIG. 14, units having the same ones in the thronging determination device 1 according to the first embodiment are given the same reference numerals as the latter. And descriptions for those units will be omitted.

The thronging determination device 20 according to the second embodiment is different from the thronging determination device 1 according to the first embodiment in that a degree-of-congestion estimating unit 21 and a move-to-thronging-determination determining unit 22 are added to increase the accuracy of thronging determination. The degree-of-congestion estimating unit 21 estimates the degree of congestion in the whole of an input image. If the estimated degree of congestion is high, the move-to-thronging-determination determining unit 22 prohibits execution of thronging determination processing and displays information to that effect on the display unit 15.

Figure 15:
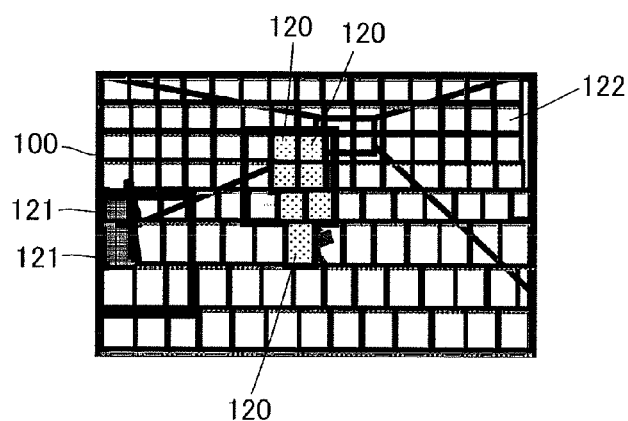
FIG. 15 illustrates a specific example of calculation of the degree of congestion in the thronging determination device of FIG. 14.

FIG. 15, which is basically the same as FIG. 3E, illustrates a specific example of calculation of the degree of congestion. As shown in FIG. 15, the degree of congestion (%) is obtained by dividing the sum of the number of local regions with human motion and the number of local regions without human motion by the number of all local regions.

The configuration in which the degree-of-congestion estimating unit 21 and the move-to-thronging-determination determining unit 22 are added in the above-described manner makes it possible to increase the accuracy of thronging determination and hence to determine occurrence of thronging with higher accuracy than the thronging determination device 1 according to the first embodiment.

Embodiment 3

Figure 16:
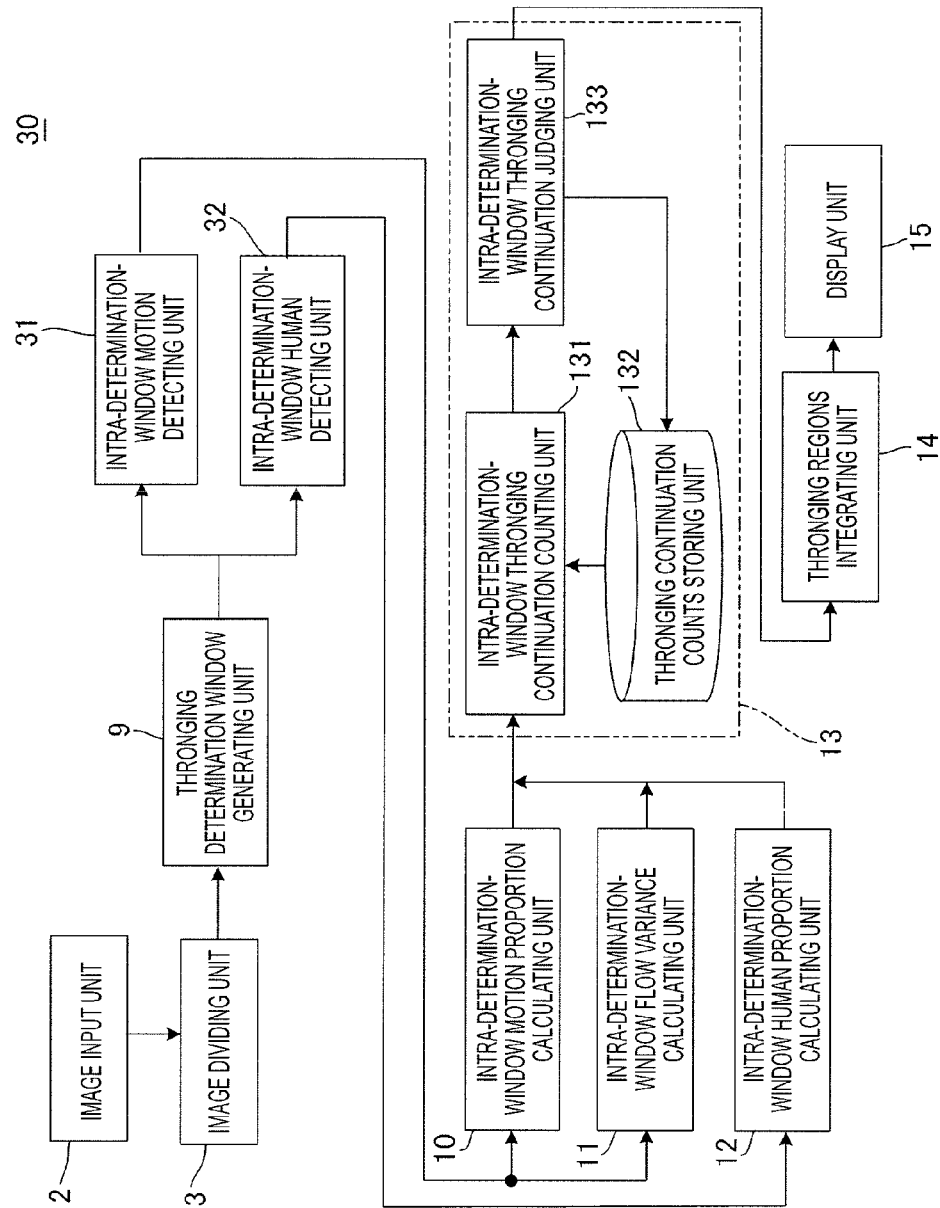
FIG. 16 is a block diagram showing a general configuration of a thronging determination device according to a third embodiment of the invention.
Figure 17:
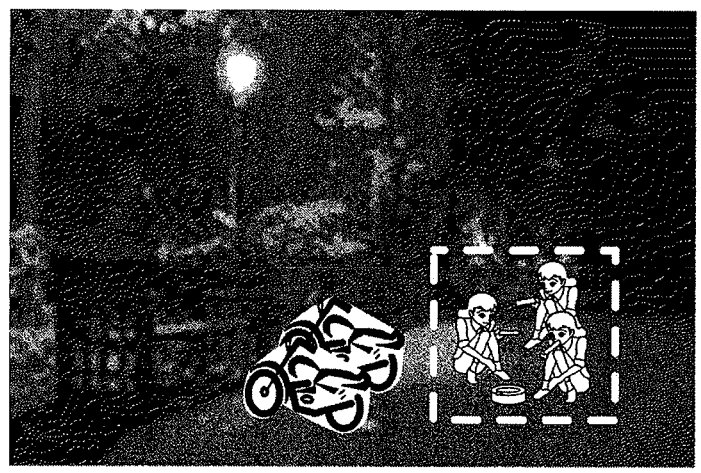
FIG. 17 shows one type of throng, people hanging out.
Figure 18:
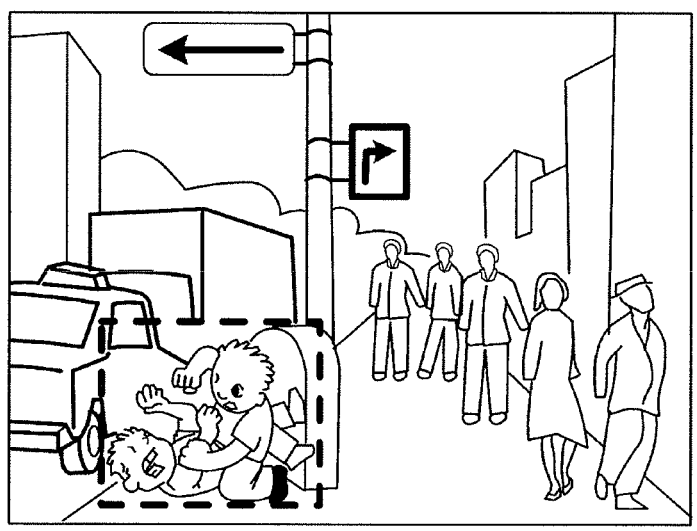
FIG. 18 shows another type of throng, persons fighting and curious onlookers.

FIG. 16 is a block diagram showing a general configuration of a thronging determination device according to a third embodiment of the invention. In FIG. 16, units having the same ones in the thronging determination device 1 according to the first embodiment are given the same reference numerals as the latter. And descriptions for those units will be omitted.

The thronging determination device 30 according to the third embodiment is configured so that each of intra-determination-window motion detection and intra-determination-window human detection is performed by a raster scan. An intra-determination-window motion detecting unit 31 and an intra-determination-window person detecting unit 32 are provided downstream of the thronging determination window generating unit 9. Motion detection results of the intra-determination-window motion detecting unit 31 are input to each of the intra-determination-window motion proportion calculating unit 10 and the intra-determination-window flow variance calculating unit 11. Human detection results of the intra-determination-window person detecting unit 32 are input to the intra-determination-window human proportion calculating unit 12.

As in the thronging determination device 1 according to the first embodiment, the configuration in which each of intra-determination-window motion detection and intra-determination-window human detection is performed by a raster scan makes it possible to determine, with high accuracy, occurrence of a throng at such a place as a bustling street which would always be crowded with people and to determine occurrence of a motionless throng such as people hanging out.

Although the invention has been described in detail using the particular embodiments, it is apparent to those skilled in the art that various changes and modifications are possible without departing from the spirit and scope of the invention.

Providing the advantages that the present invention makes it possible to determine, with high accuracy, occurrence of a throng at such a place as a bustling street which would always be crowded with people and to determine occurrence of a motionless throng such as people hanging out, the invention can be applied to, for example, surveillance systems for detecting a local gathering of indefinite persons.

What is claimed is:

1. A thronging determination device for determining occurrence of a thronging state in which persons are gathered locally, the device comprising:
   an image receiver that receives an image;
   an image divider that divides an input image received by the image receiver into local regions;
   a degree-of-congestion estimator that judges the degree of congestion in plural ones of the local regions, and
   a thronging determination window generator that generates a thronging determination window consisting of the local regions that are smaller in number than the local regions that have been used in judging the degree of congestion,
   wherein if the degree-of-congestion estimator judges that the degree of congestion in the plural ones of the local regions is lower than a prescribed value, a thronging determination is performed using local regions that are smaller in number than the local regions that have been used in estimating the degree of congestion, and
   wherein the thronging determination is performed in such a manner that:
   a first thronging continuation state is updated if a motion proportion, which is a ratio of the number of local regions judged to have motion to the number of local regions included in the thronging determination window, is larger than or equal to a prescribed value and a statistical quantity of the local regions that have been judged to have motion is larger than or equal to a prescribed value;
      a second thronging continuation state is updated if the motion proportion is smaller than the prescribed value and a human proportion, which is a ratio of the number of local regions judged to contain a person to the number of local regions included in the thronging determination window, is larger than or equal to a prescribed value; and
      a thronging state of the input image is judged on the basis of at least one of the first thronging continuation state and the second thronging continuation state that are obtained from the input image.

2. The thronging determination device according to claim 1, wherein a whole of the input image is scanned using the thronging determination window and thronging-positive regions that have been judged to have a throng are integrated together.

3. The thronging determination device according to claim 1, wherein the statistical quantity is a flow variance.

4. The thronging determination device according to claim 3, wherein the flow variance is a variance that is calculated on the basis of directions of motion vectors of the respective local regions judged to have motion.

5. The thronging determination device according to claim 3, wherein:
   the first thronging continuation state is indicated by a count of a first counter;
   the count of the first counter is incremented if the flow variance of the local regions judged to have motion is larger than or equal to a prescribed value and decremented if the flow variance of the local regions judged to have motion is smaller than the prescribed value; and
   it is judged that a throng exists in the input image if the count of the first counter is larger than or equal to a prescribed value.

6. The thronging determination device according to claim 4, wherein:
   the first thronging continuation state is indicated by a count of a first counter;
   the count of the first counter is incremented if the flow variance of the local regions judged to have motion is larger than or equal to a prescribed value and decremented if the flow variance of the local regions judged to have motion is smaller than the prescribed value; and
   it is judged that a throng exists in the input image if the count of the first counter is larger than or equal to a prescribed value.

7. The thronging determination device according to claim 3, wherein:
   the second thronging continuation state is indicated by a count of a second counter;
   the count of the second counter is incremented if the human proportion is larger than or equal to the prescribed value, and decremented if the human proportion is smaller than the prescribed value; and
   it is judged that a throng exists in the input image if the count of the second counter is larger than or equal to a prescribed value.

8. A thronging determination method for determining occurrence of a thronging state in which persons are gathered locally, the method comprising:
   receiving an image;
   dividing an input received image into local regions; and
   judging the degree of congestion in plural ones of the local regions,
   generating a thronging determination window consisting of the local regions that are smaller in number than the local regions that have been used in judging the degree of congestion,
   wherein if it is judged that the degree of congestion in the plural ones of the local regions is lower than a prescribed value in the degree-of-congestion, judging, performing a thronging determination using local regions that are smaller in number than the local regions that have been used in judging the degree of congestion, wherein the thronging determination is performed in such a manner that:

a first thronging continuation state is updated if a motion proportion, which is a ratio of the number of local regions judged to have motion to the number of local regions included in the thronging determination window, is larger than or equal to a prescribed value and a statistical quantity of the local regions that have been judged to have motion is larger than or equal to a prescribed value;

a second thronging continuation state is updated if the motion proportion is smaller than the prescribed value and a human proportion, which is a ratio of the number of local regions judged to contain a person to the number of local regions included in the thronging determination window, is larger than or equal to a prescribed value; and a thronging state of the input image is judged on the basis of at least one of the first thronging continuation state and the second thronging continuation state that are obtained from the input image.

9. The thronging determination method according to claim 8, wherein a whole of the input image is scanned using the thronging determination window and thronging-positive regions that have been judged to have a throng are integrated together.

10. The thronging determination method according to claim 8, wherein the statistical quantity is a flow variance.

11. The thronging determination method according to claim 10, further comprising calculating the flow variance on a basis of directions of motion vectors of the respective local regions judged to have motion.

12. The thronging determination method according to claim 10, further comprising:

indicating the first thronging continuation state by a count of a first counter;

incrementing the count of the first counter if the flow variance of the local regions judged to have motion is larger than or equal to a prescribed value and decrementing the count if the flow variance of the local regions judged to have motion is smaller than the prescribed value; and judging that a throng exists in the input image if the count of the first counter is larger than or equal to a prescribed value.

13. The thronging determination method according to claim 11, further comprising:

indicating the first thronging continuation state by a count of a first counter;

incrementing the count of the first counter if the flow variance of the local regions judged to have motion is larger than or equal to a prescribed value and decrementing the count if the flow variance of the local regions judged to have motion is smaller than the prescribed value; and judging that a throng exists in the input image if the count of the first counter is larger than or equal to a prescribed value.

14. The thronging determination method according to claim 10, further comprising:

indicating the second thronging continuation state by a count of a second counter;

incrementing the count of the second counter if the human proportion is larger than or equal to the prescribed value, and decrementing the count if the human proportion is smaller than the prescribed value; and judging that a throng exists in the input image if the count of the second counter is larger than or equal to a prescribed value.

* * * * *